United States Patent
Taylor et al.

(10) Patent No.: US 10,708,709 B2
(45) Date of Patent: *Jul. 7, 2020

(54) SYSTEM AND METHOD FOR AUTOMATICALLY DETECTING AND INITIATING A WALK

(71) Applicant: Mars, Incorporated, McLean, VA (US)

(72) Inventors: Brad Taylor, San Francisco, CA (US); Daniel James Harman, Dawesville (AU)

(73) Assignee: Mars, Incorporated, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,057

(22) Filed: Nov. 6, 2018

(65) Prior Publication Data

US 2019/0090087 A1    Mar. 21, 2019

Related U.S. Application Data

(63) Continuation of application No. 15/291,882, filed on Oct. 12, 2016, now Pat. No. 10,142,773.

(51) Int. Cl.
| | |
|---|---|
| *H04W 24/00* | (2009.01) |
| *H04W 4/021* | (2018.01) |
| *H04W 4/02* | (2018.01) |
| *H04W 40/24* | (2009.01) |
| *H04B 1/3827* | (2015.01) |

(52) U.S. Cl.
CPC ............ *H04W 4/021* (2013.01); *H04B 1/385* (2013.01); *H04W 4/023* (2013.01); *H04W 4/025* (2013.01); *H04W 40/246* (2013.01)

(58) Field of Classification Search
CPC ..... H04W 4/021; H04W 4/023; H04W 4/025; H04W 40/246; H04W 52/0241; H04W 52/0258; H04B 1/385; G01S 19/48
See application file for complete search history.

(56) References Cited

U.S. PATENT DOCUMENTS

| | | |
|---|---|---|
| 8,836,501 B2 | 9/2014 | Song et al. |
| 9,288,620 B2 | 3/2016 | Menendez |
| 9,638,537 B2 | 5/2017 | Abramson et al. |
| (Continued) | | |

*Primary Examiner* — Barry W Taylor
(74) *Attorney, Agent, or Firm* — Mars, Incorporated; Rebecca M. Barnett

(57) ABSTRACT

Systems, methods, and apparatuses for detecting the start of a walk event are disclosed. The method comprises detecting that a wearable device is in a walk mode if it is determined that the wearable device has exited a geo-fence zone and that the wearable device is not connected to a wireless network; comparing current environment details associated with the wearable device to past walk environment details associated with the wearable device to identify at least one similarity between the current environment details and the past walk environment details; confirming that the wearable device is in the walk mode upon identifying at least one similarity between the current environment details and the past walk environment details, the predictive function refined using the one or more previous responses to a walk mode prompt; and transmitting a recorded GPS location of the wearable device while the wearable device is in a walk mode.

20 Claims, 5 Drawing Sheets

(56) References Cited

U.S. PATENT DOCUMENTS

| | | |
|---|---|---|
| 9,730,027 B2 | 8/2017 | Su et al. |
| 10,142,773 B2 * | 11/2018 | Taylor .................. H04W 4/021 |
| 2015/0097731 A1 | 4/2015 | Russell |
| 2016/0066155 A1 | 3/2016 | Fan et al. |
| 2016/0253889 A1 | 9/2016 | Keyton |
| 2018/0103342 A1 | 4/2018 | Taylor et al. |

* cited by examiner

SYSTEM AND METHOD FOR AUTOMATICALLY DETECTING AND INITIATING A WALK

CROSS-REFERENCE TO RELATED APPLICATIONS

This application is a continuation of U.S. patent application Ser. No. 15/291,882, filed Oct. 12, 2016.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever

BACKGROUND

The embodiments described in the disclosure relate to the field of activity or location-based tracking and specifically, to automatically detecting the start of a walk event of a wearable tracking device.

Human users are increasingly using wearable devices to utilize numerous computing functions provided by a conveniently sized device. Frequently, wearable devices are utilized to measure and track human activity to maintain a healthy lifestyle and monitor progress towards specific fitness goals.

Recently, wearable devices have been created to monitor and analyze the movement and activity of non-human wearers, such as household pets. Wearable devices placed on household pets also allow for the monitoring of movement and activity and allow for the tracking of household pets while owners are not present.

Frequently however, household pets exhibit a significant amount of inertia and lack the ability to manually (and intentionally) control a wearable device. Thus, current wearable devices designed for animals require constant GPS monitoring to track the location and activity of the animals despite the relative level of inactivity of the animal. Such constant monitoring is required as the wearable device has no way to intelligently determine when GPS tracking is required and when it is not required.

Constant use of GPS receivers significantly impacts the battery life of a wearable device and thus require the device to be recharged frequently, often every day or multiple times per day. Moreover, constant GPS polling (and transmittal to a server) requires significant bandwidth expenditures that, depending on the network use, may be both costly and impractical. Further, given the relatively long periods of inactivity, the collection of GPS data at all times for animals is unnecessary. Instead, GPS data is only needed during relatively brief periods of an animal's day.

Thus, there exists a need in the art for a system, device, and method for intelligently monitoring the location of a wearable device and determining when elevated GPS monitoring is required based on the activity of the wearable device.

BRIEF SUMMARY

To remedy the aforementioned deficiencies, the disclosure presents systems, methods, and apparatuses for automatically monitoring the location of a wearable device and selecting enabling GPS tracking of said device in response to the determination that the device is engaging in a walk activity.

In one embodiment, the disclosure describes a method for detecting the start of a walk event. The method includes identifying the location of a wearable device; determining if the wearable device has exited a geo-fence zone; confirming that a wearable device is in a walk mode if it is determined that the wearable device has exited a geo-fence zone and that the wearable device is not connected to a wireless network; enabling a GPS receiver; continuously recording the location of the wearable device received from the GPS receiver while the wearable device is in a walk mode; and transmitting the recorded location of the wearable device while the wearable device is in a walk mode.

In one embodiment, the disclosure describes an apparatus for detecting the start of a walk event. The apparatus includes a processor, GPS receiver, and a non-transitory memory storing computer-executable instructions therein that, when executed by the processor. The computer-executable instructions cause the apparatus to identify the location of a wearable device; determine if the wearable device has exited a geo-fence zone; confirm that a wearable device is in a walk mode if it is determined that the wearable device has exited a geo-fence zone and that the wearable device is not connected to a wireless network; enable the GPS receiver; continuously record the location of the wearable device received from the GPS receiver while the wearable device is in a walk mode; and transmit the recorded location of the wearable device while the wearable device is in a walk mode.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
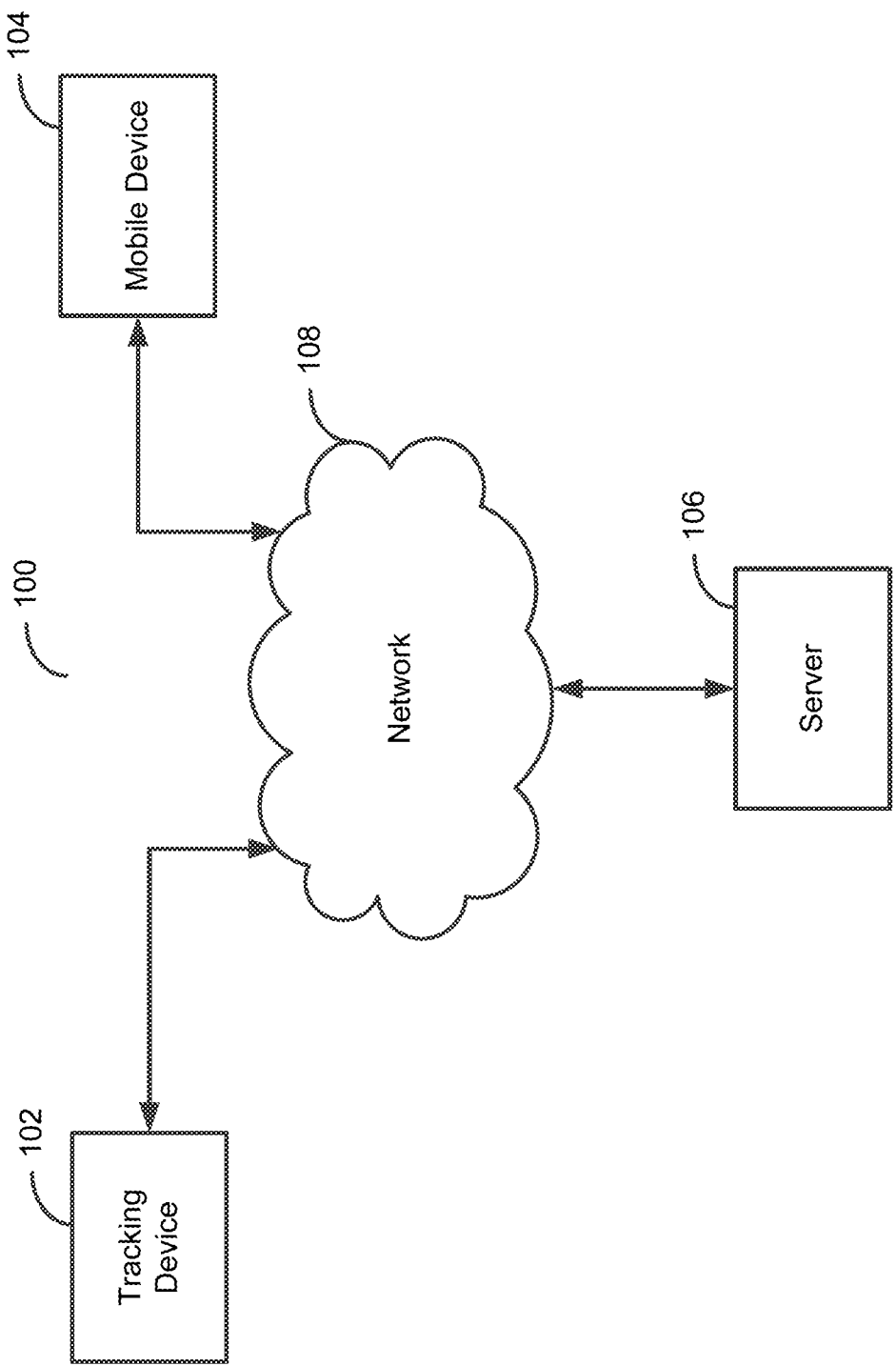
FIG. 1 is a network diagram illustrating a system for detecting the start of a walk event according to some embodiments of the disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

FIG. 1 is a network diagram illustrating a system for detecting the start of a walk event according to some embodiments of the disclosure. As illustrated in FIG. 1, the system 100 includes a tracking device 102, mobile device 104, server 106, and network 108.

As illustrated in FIG. 1, a tracking device 102 may comprise a computing device designed to be worn, or otherwise carried, by a user or other entity, such as an animal. In one embodiment, the tracking device 102 may include the hardware illustrated in FIG. 2. The tracking device 102 may be configured to collect data generated by various hardware components present within the tracking device 102, such as GPS receivers, accelerometers, gyroscopes, or other devices capable of recording data regarding the movement or activity of the tracking device 102.

As discussed in more detail herein, tracking device 102 may further include processing logic (e.g., a CPU) capable of receiving and processing the motion data. In some embodiments, the tracking device 102 may specifically be configured to receive data and pre-process data prior to transmittal. In addition to recording and processing data, tracking device 102 may further be configured to transmit data, including location and event data, to other devices via network 108. Specific embodiments of processing and transmitting data are described more fully with respect to FIGS. 4 through 5.

Although illustrated as a single network, network 108 may comprise multiple networks facilitating communication between devices. In one embodiment, the network 108 may include a wireless fidelity ("Wi-Fi") network as defined by the IEEE 802.11 standards or equivalent standards. In this embodiment, the network 108 may enable the transfer of location or event data from tracking device 102 to server 106. Additionally, the network 108 may facilitate the transfer of data between tracking device 102 and mobile device 104. In an alternative embodiment, the network 108 may comprise a mobile network such as a cellular network. In this embodiment, data may be transferred between the illustrated devices in a manner similar to the embodiment wherein the network 108 is a Wi-Fi network. Notably, however, if network 108 comprises a mobile network, data transfers may be throttled or subject to interference which reduces the bandwidth of the network. Finally, in one embodiment, network 108 may comprise a Bluetooth network. In this embodiment, tracking device 102 and mobile device 104 may be capable of transferring data between themselves. However, server 106 may not be able to communicate with tracking device 102 and mobile device 104. While described in isolation, network 108 may include multiple networks. For example, network 108 may include a Bluetooth network facilitating transfers of data between tracking device 102 and mobile device 104, a Wi-Fi network, and a mobile network.

The system 100 may further include a mobile device 104. In one embodiment, a mobile device 104 may include a mobile phone or tablet device. In alternative embodiments, the system 100 may additionally include laptop computers, desktop computers, or other personal computing devices to perform some of the functions described with respect to mobile device 104. As discussed previously, mobile device 104 may communicate with a tracking device 102 via a Wi-Fi network or Bluetooth network. In these embodiments, mobile device 104 may receive location or event data from a tracking device 102 as described in more detail herein. Additionally, tracking device 102 may receive data from mobile device 104. In one embodiment, tracking device 102 may receive data regarding the proximity of mobile device 104 to tracking device 102 or an identification of a user associated with mobile device 104.

Mobile device 104 (or non-mobile device) may additionally communicate with server 106 to receive data from server 106. For example, server 106 may include one or more application servers providing a networked application or application programming interface (API). In one embodiment, mobile device 104 may be equipped with an application that communicates with server 106 via an API to retrieve and present data within the application. In one embodiment, server 106 may provide visualizations of location or event data received from tracking device 102. For example, visualization data may include graphs, charts, or other representations of data received from tracking device 102. An example of a mobile application that receives data from server 106 is depicted in FIG. 6.

Figure 2:
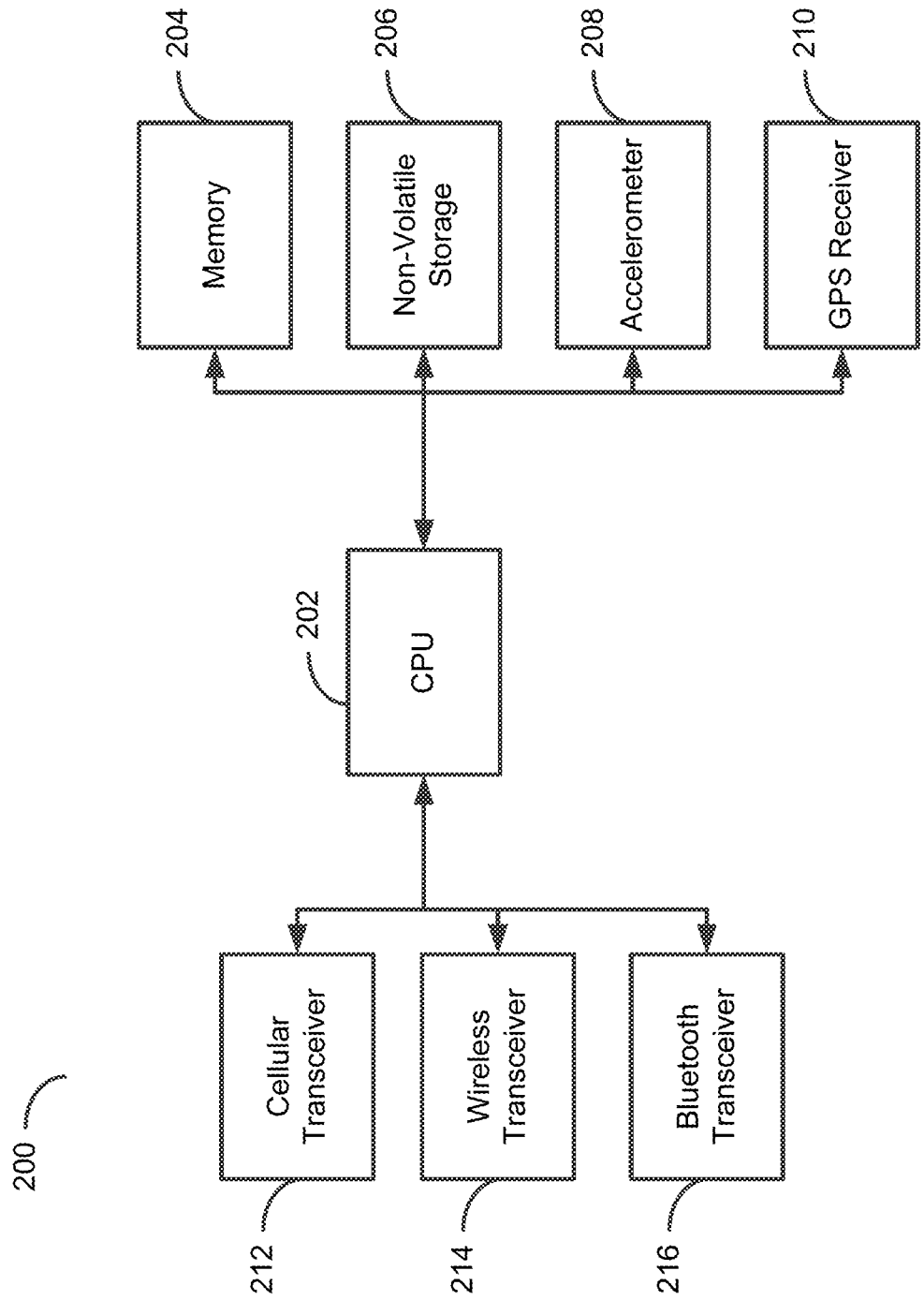
FIG. 2 is a physical diagram illustrating a tracking device for detecting the start of a walk event according to some embodiments of the disclosure.

FIG. 2 is a physical diagram illustrating a tracking device for detecting the start of a walk event according to some embodiments of the disclosure. The device 200 includes a CPU 202, memory 204, non-volatile storage 206, accelerometer 208, GPS receiver 210, cellular transceiver 212, Bluetooth transceiver 216, and wireless transceiver 214.

As discussed with respect to FIG. 1, the device 200 may comprise a computing device designed to be worn, or otherwise carried, by a user or entity such as an animal. The device 200 includes an accelerometer 208 and GPS receiver 210 which monitor the device 200 to identify its position (via GPS receiver 210) and its acceleration (via accelerometer 208). Although illustrated as a single component, accelerometer 208 and GPS receiver 210 may alternatively each include multiple components providing similar functionality.

Accelerometer 208 and GPS receiver 210 generate data as described in more detail herein and transmits the data to other components via CPU 202. Alternatively, or in conjunction with the foregoing, accelerometer 208 and GPS receiver 210 may transmit data to memory 204 for short-term storage. In one embodiment, memory 204 may comprise a random access memory device or similar volatile storage device. Alternatively, or in conjunction with the foregoing, accelerometer 208 and GPS receiver 210 may transmit data directly to non-volatile storage 206. In this embodiment, CPU 202 may access the data (e.g., location and/or event data) from memory 204. In some embodiments, non-volatile storage 206 may comprise a solid-state storage device (e.g., a "flash" storage device) or a traditional storage device (e.g., a hard disk). Specifically, GPS receiver 210 may transmit location data (e.g., latitude, longitude, etc.) to CPU 202, memory 204, or non-volatile storage 206 in similar manners. In some embodiments, CPU 202 may comprise a field programmable gate array or customized application-specific integrated circuit.

As illustrated in FIG. 2, the device 200 includes multiple network interfaces including cellular transceiver 212, wireless transceiver 214, and Bluetooth transceiver 216. As discussed in connection with FIG. 1, cellular transceiver 212 enables the device 200 to transmit event or location data, processed by CPU 202, to a server via a mobile or radio network. Additionally, CPU 202 may determine the format and contents of data transferred using cellular transceiver 212, wireless transceiver 214, and Bluetooth transceiver 216 based upon detected network conditions.

Figure 3:
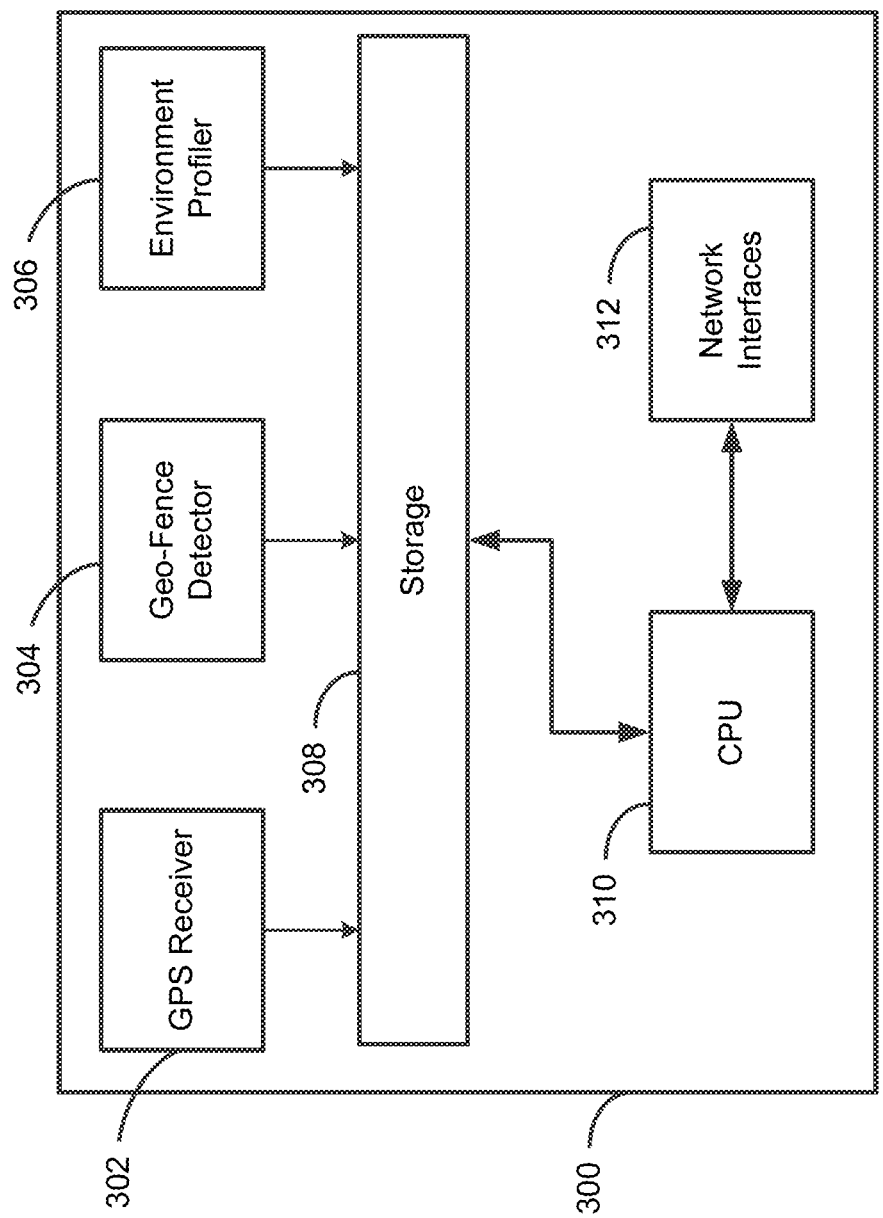
FIG. 3 is a logical block diagram illustrating a tracking device for detecting the start of a walk event according to some embodiments of the disclosure.

FIG. 3 is a logical block diagram illustrating a tracking device for detecting the start of a walk event according to some embodiments of the disclosure. As illustrated in FIG. 3, a device 300 includes a GPS receiver 302, a geo-fence detector 304, an environment profiler 306, storage 308, CPU 310, and network interfaces 312.

In the illustrated embodiment, GPS receiver 302 records location data associated with the device 300 including numerous data points representing the location of the device 300 as a function of time.

In one embodiment, geo-fence detector 304 stores details regarding known geo-fence zones. For example, geo-fence detector 304 may store a plurality of latitude and longitude points for a plurality of polygonal geo-fences. In alternative embodiments, geo-fence detector 304 may store the names of known Wi-Fi network SSIDs and associate each of the SSIDs with a geo-fence, as discussed in more detail with respect to FIGS. 4 and 5. In one embodiment, geo-fence detector 304 may store, in addition to an SSID, one or more thresholds for determining when the device 300 exits a geo-fence zone. Although illustrated as a separate component, in some embodiments, geo-fence detector 304 may be implemented within CPU 310, for example, as a software module.

In one embodiment, GPS receiver 302 may transmit latitude and longitude data to geo-fence detector 304 via storage 308 or, alternatively, indirectly to storage 308 via CPU 310. In these embodiment, geo-fence detector 304 receives the latitude and longitude data representing the current location of the device 300 and determines whether the device 300 is within or has exited a geo-fence zone. If geo-fence detector 304 determines that the device 300 has exited a geo-fence zone the geo-fence detector 304 may transmit the notification to CPU 310 for further processing.

Alternatively, geo-fence detector 304 may query network interfaces 312 to determine whether the device is connected to a Wi-Fi network. In this embodiment, geo-fence detector 304 may compare the current Wi-Fi SSID (or lack thereof) to a list of known SSIDs. If geo-fence detector 304 does not detect that the device 300 is currently connected to a known SSID, geo-fence detector 304 may transmit a notification to CPU 310 that the device has exited a geo-fence zone. Alternatively, geo-fence detector 304 may receive the strength of a Wi-Fi network and determine whether the current strength of a Wi-Fi network is within a predetermined threshold as described more fully with respect to FIG. 4.

As illustrated in FIG. 3, device 300 further includes environment profiler 306. In one embodiment, environment profiler 306 stores past walk environment details regarding the environmental conditions when previous walk modes were enabled. For example, past walk environment details may include the time of day, the location of the tracking device, movement data associated with the device (e.g., velocity, acceleration, etc.) for previous time a walk mode was enabled. Past walk environment details may additionally include a schedule of walks, a listing of responses to walk mode prompts, and other relevant details. In one embodiment, the environment profiler 306 may retrieve past walk environment details from local storage present on a tracking device. Alternatively, or in conjunction with the foregoing, environment profiler 306 may retrieve past walk environment details from a server via network interfaces 312. Embodiments of methods performed by environment profiler 306 are described more fully with respect to FIG. 5 and are not repeated herein for the sake of clarity. Although illustrated as a separate component, in some embodiments, environment profiler 306 may be implemented within CPU 310, for example, as a software module.

CPU 310 is capable of controlling access to storage 308, retrieving data from storage 308, and transmitting data to a networked device via network interfaces 312. As discussed more fully with respect to FIGS. 4 and 5, CPU 310 may receive indications of geo-fence zone exits from geo-fence detector 304 and may communicate with a mobile device using network interfaces 312. Additionally, CPU 310 may receive an indication that a walk mode should be enabled from environment profile 306 and may enable a walk mode accordingly. In one embodiment, when a walk mode is enabled, CPU 310 may receive location data from GPS receiver 302 and may store the location data in storage 308. In one embodiment, storing location data may comprise associated a timestamp with the data. In some embodiments, CPU 310 may retrieve location data from GPS receiver 302 according to a pre-defined interval. In some embodiments, this interval may be dynamically changed based on the estimated length of a walk or the remaining battery life of the device 300. CPU 310 may further be capable of transmitting location data to a remove device or location via network interfaces 312.

Figure 4:
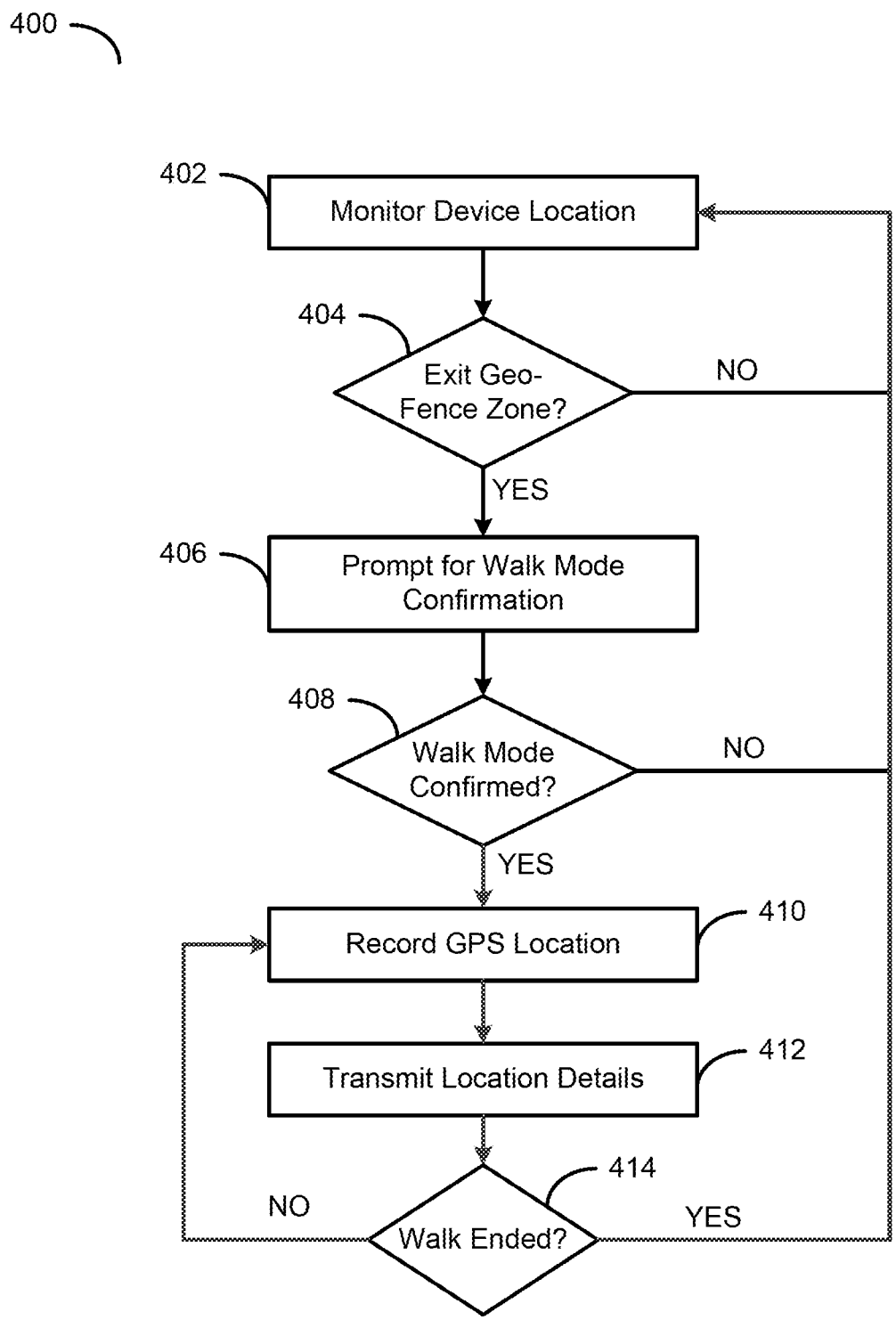
FIG. 4 is a flow diagram illustrating a method for detecting the start of a walk event according to some embodiments of the disclosure.

FIG. 4 is a flow diagram illustrating a method for detecting the start of a walk event according to some embodiments of the disclosure.

In step 402, the method 400 monitors the location of a device. In one embodiment, monitoring the location of a device may comprise monitoring the GPS position of the device at regular intervals. For example, the method 400 may poll a GPS receiver every five seconds and retrieve a latitude and longitude of a device. Alternatively, in some embodiments, continuous polling of a GPS location may significantly reduce the battery life of the device. Thus, in these embodiments, the method 400 may utilize other methods for estimating the position of the device. In one embodiment, the method 400 may monitor the location of a device by determining whether the device is connected to a known Wi-Fi network and using the connection to a Wi-Fi network as an estimate of the device location. In alternative embodiments, a device may be paired to a mobile device via a Bluetooth network. In this embodiment, the method 400 may query the paired device to determine its location using, for example, the GPS coordinates of the mobile device.

In step 404, the method 400 determines whether the device has exited a geo-fence zone. As discussed previously, in one embodiment, the method 400 may continuously poll a GPS receiver to determine the latitude and longitude of a device. In this embodiment, the method 400 may then compare the received latitude and longitude to a known geo-fence zone, wherein the geofenced region includes a set of latitude and longitude points defining a polygonal region. Alternatively, in the embodiment where the method 400 uses the presence of a Wi-Fi network as indicative of a location, the method 400 may determine that a device exits geo-fence zone when the presence of a known Wi-Fi network is not detected. For example, a tracking device may be configured to identify a home network (e.g., using the SSID of the network). When the device is present within the home (e.g., when a pet is present within the home), the method 400 may determine that the device has not exited the geo-fence zone. However, as the device moves out of range of the known Wi-Fi network, the method 400 may determine that a geo-fence zone has been exited, thus implicitly constructing a geo-fence zone based on the contours of the Wi-Fi network.

Alternatively, or in conjunction with the foregoing, the method 400 may employ a continuous detection method to determine whether a device exits a geo-fence zone. Specifically, Wi-Fi networks generally degrade in signal strength the further a receiver is from the wireless access point. In one embodiment, the method 400 may receive the signal strength of a known Wi-Fi network from a wireless transceiver. In this embodiment, the method 400 may set one or more predefined thresholds to determine whether a device exits geo-fence.

For example, a hypothetical Wi-Fi network may have signal strengths between ten (strongest) and zero (absence). In a first embodiment, the method 400 may simply monitor for a signal strength of zero before determining that a device exited a geo-fence zone. Alternatively, or in conjunction with the foregoing, the method 400 may set a threshold signal strength value of three as defining a beacon zone (i.e., signal strength between 3 and 10) and implicitly setting a second threshold (i.e., between 0 and 3) as the border of a geo-fence region. In this example, the method 400 may determine a device exited a geo-fence when the signal strength of a Wi-Fi network drops below a value of three. In some embodiments, the method 400 may utilize a timer to allow for the possibility of the Wi-Fi signal strength returning above the predefined threshold. In this embodiment, the method 400 allows for temporary disruptions in Wi-Fi signal strength and avoids false positives.

If the method 400 determines that a device has not exited a geo-fence zone, the method 400 continues to monitor the device location in step 402. Alternatively, if the method 400 determines that a device has exited a geo-fence zone, the method 400 prompts a user to confirm that a walk mode should be enabled in step 406. In one embodiment, prompting for a walk mode confirmation may additionally include determining whether the device is with a known user, as described more fully with respect to FIG. 5.

In one embodiment, prompting a user to confirm a walk mode may comprise notifying a user's mobile device. For example, a tracking device may be paired with a mobile device via a Bluetooth connection. In this embodiment, the method 400 may comprise alerting the device via the Bluetooth connection that a walk mode has been detected and allowing the user to confirm the same (e.g., by providing an on-screen notification). Alternatively, a user may be notified by receiving a notification from a server, the notification generated based on the tracking device communicating the detection of a walk mode to said server.

In alternative embodiments, the method 400 may bypass step 406 and infer the start of a walk mode using various techniques. In one embodiment, the method 400 may identify the presence of a known device associated with walk modes. For example, the method 400 may detect the presence of a device carried by a dog walker and thus may infer that a walk mode has started when the device and the dog walker's device simultaneously exit a geo-fence region.

Alternatively, or in conjunction with the foregoing, the method 400 may infer the start of a walk based on the time of day. For example, a user may schedule walks at certain times during the day (e.g., morning, afternoon, or night). As part of detecting whether a device exited a geo-fence zone, the method 400 may further inspect a schedule of known walks to determine whether the timing of the geo-fence exiting occurred at an expected walk time (or within an acceptable deviation therefrom).

Alternatively, or in conjunction with the foregoing, the method 400 may employ machine-learning techniques to infer the start of a walk without requiring the above input from a user. For example, during the first few instances of detecting a walk mode, the method 400 may continue to prompt the user to confirm that a walk mode has begun. As the method 400 receives input from users confirming or denying a walk mode has begun, the method 400 may train a learning machine to identify conditions associated with walks. For example, after a few prompt confirmations, the method 400 may determine that on weekdays between 7:00 AM and 7:30 AM, a tracking device repeatedly enables a walk mode (i.e., conforming to a morning walk of a pet). Relatedly, the method 400 may learn that the same event (e.g., a morning walk) may occur later on weekends (e.g., between 8:00 AM and 8:30 AM).

In this manner, the method 400 may bypass an explicit prompting of the user and may simply presume a walk mode has been confirmed. In this embodiment, the method 400 may allow a user to disable a walk mode or retroactively cancel a walk mode to further refine the automatic detection of a walk mode.

If the user does not confirm that a walk mode should be enabled, the method 400 may continue to monitor the device location in step 402. Alternatively, if the user does confirm that a walk mode should be enabled, the method 400 begins to record the GPS location of the device in step 410.

In one embodiment, the method 400 may continuously poll the GPS location of a device to provide multiple "breadcrumbs" that a device encounters while a walk mode is enabled. In some embodiments, a poll interval of a GPS device may be adjusted based on the battery level of the device. In alternative embodiments, the poll interval may be adjusted based on the expected length of the walk mode. That is, if a walk mode is expected to last for thirty minutes (e.g., while walking a dog), the method 400 may calculate, based on battery life, the optimal poll interval. As discussed above, the length of a walk may be input manually by a user or may be determining using a machine-learning algorithm based on previous walks.

In step 412, the method 400 transmits location details. In one embodiment, the method 400 continuously transmits GPS location details to a server while a walk mode is enabled. As discussed above, the method 400 may utilize a poll interval to determine how frequently to send data. In one embodiment, the method 400 may transmit location data using a cellular or other radio network. Methods for transmitting location data over cellular networks are described more fully in commonly owned U.S. Non-Provisional application Ser. No. 15/287,544, entitled "System and Method for Compressing High Fidelity Motion Data for Transmission Over a Limited Bandwidth Network," which is hereby incorporated by reference herein in its entirety.

Finally, the method 400 determines whether a walk has ended, step 414. If so, the method 400 returns to monitoring the location of the device. If not, the method 400 continues to record the GPS location of the device.

In one embodiment, the method 400 may determine that a walk mode has ended by detecting, using the GPS location of the device, that the device has re-entered a geo-fence zone, as discussed previously. Alternatively, or in conjunction with the foregoing, the method 400 may determine a walk mode has ended by detecting the presence of a known Wi-Fi network as discussed previously. Alternatively, or in conjunction with the foregoing, the method 400 may receive a notification from a user that a walk mode has ended.

Figure 5:
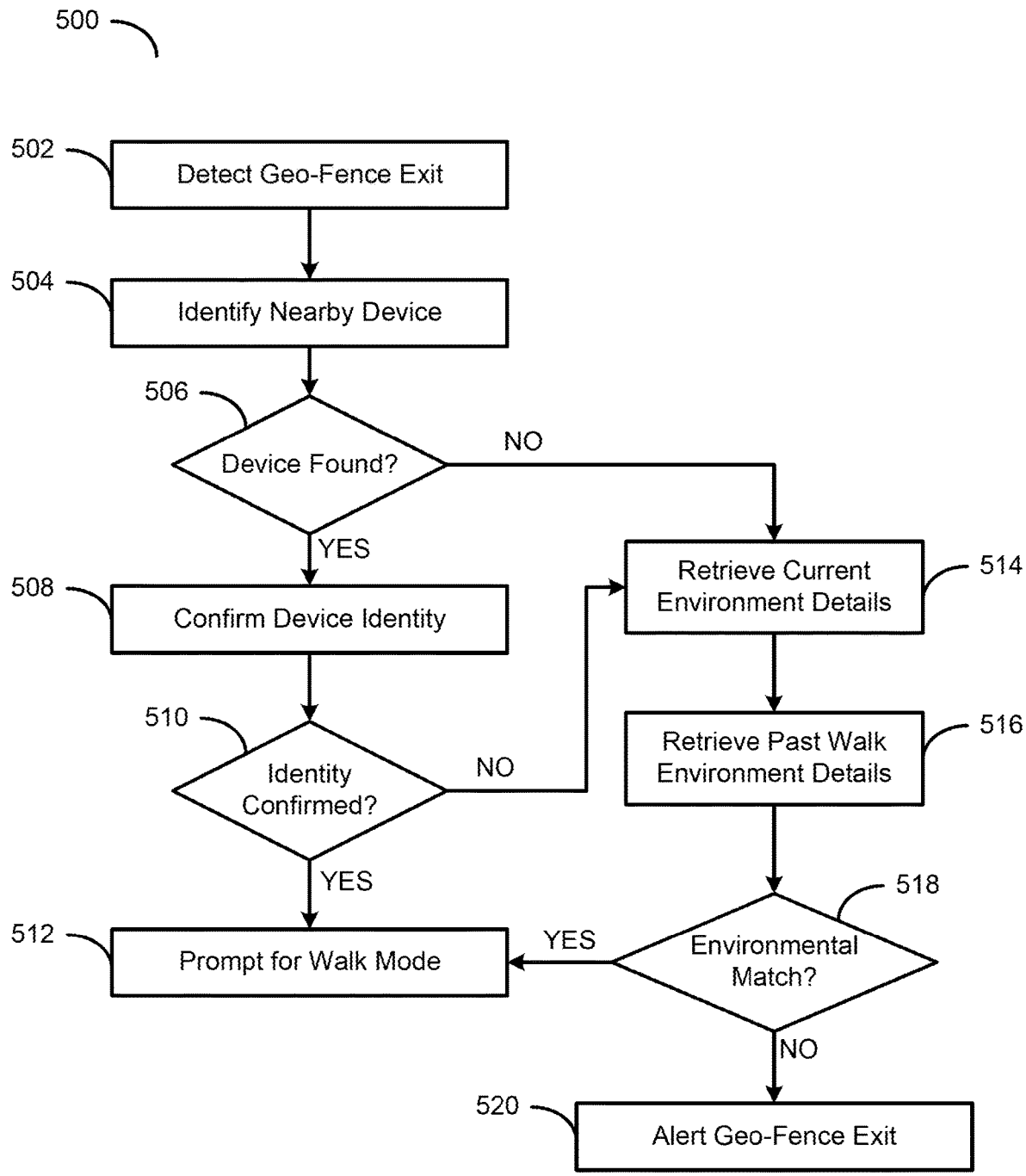
FIG. 5 is a flow diagram illustrating a method for confirming the start of a walk event according to some embodiments of the disclosure.

FIG. 5 is a flow diagram illustrating a method for confirming the start of a walk event according to some embodiments of the disclosure.

In step 502, the method 500 detects whether a device has exited a geo-fence zone. Detecting an exit from a geo-fence zone is discussed in more detail with respect to FIG. 4 and is not repeated herein for the sake of clarity.

In step 504, the method 500 identifies a mobile device. In one embodiment, identifying a mobile device may comprise identifying a mobile device connected to a tracking device via a Bluetooth network. For example, upon detecting a geo-fence exit, the method 500 scans for devices within range of a Bluetooth network to identify known devices (e.g., devices previously paired with the tracking device). Alternatively, or in conjunction with the foregoing, the method 500 may identify a mobile device by determining whether a known device is connected to a network, such as the Internet. In this embodiment, the method 500 may transmit a notification to a server via a cellular network. The server may, in turn, identify if any known devices are capable of receiving communications from the server (e.g., are "online"). In this manner, the method 500 may identify known devices without a short-range wireless network and may identify devices remote from the tracking device. For example, the method 500 may identify the pet owner who is currently remote from a pet equipped with a tracking device (e.g., an owner who is at work). In this manner, the method 500 may allow an owner (or account administrator) to control whether a walk mode should be enabled. Alternatively, using a local network (e.g., Bluetooth) enables the person closest to the device to enable a walk mode. In some embodiments, both techniques may be utilized in combination to validate each other.

If a device is found (step 506), the method 500 confirms the device identity, step 508.

As discussed previously, confirming the identity of a device may comprise identifying a known device present on a Bluetooth network. For example, the method 500 may query for known devices associated with pet walkers, owners, etc. In this embodiment, the method 500 may confirm the identity of a device by determining that the device has previously been paired with a tracking device. Alternatively, the method 500 may actively request that the device confirm its identity (e.g., via a notification or prompt). In alternative embodiments, the method 500 may verify the identity by detecting that the device corresponds to a known device based on the time of day. For example, the method 500 may be aware that a walk mode is regularly enabled at a specific time of day (as discussed previously), and may automatically verify the identity of a device if a device is detected at, or around, that time.

If the method 500 confirms the identity of the device, step 510, the method 500 prompts the user to enable a walk mode, step 512. Embodiments describing the implementation of a walk mode are discussed more fully with respect to FIG. 4 and are not repeated herein for the sake of clarity. As discussed herein, the method 500 may alternatively skip prompting for a walk mode in step 512 if it can predicatively determine that a walk mode should be enabled. For example, the method 500 may store a list of known devices and times associated with past walks and may predicatively determine that the confirmation of the identity of a known device at a specific time should automatically trigger a walk mode. In some embodiments, the method 500, upon automatically detecting a walk mode, may allow the owner of the device to disable a walk mode if the method 500 errantly detects a walk mode automatically.

If the method 500 does not identify a mobile device (step 506) or the method 500 cannot confirm the identity of a mobile device (step 510), the method 500 may infer that a walk mode should be enabled as illustrated in steps 514 through 520.

In step 514, the method 500 retrieves current environment details.

In the illustrated embodiment, current environment details may include data regarding the state of the tracking device when a geo-fence exit event occurs. For example, current environment details may include the time of day, the location of the tracking device, movement data associated with the device (e.g., velocity, acceleration, etc.). Although illustrated in the alternative, current environment details may additionally be collected if a device is found in step 506, or an identity is confirmed in step 510. As discussed previously, steps 514 through 518 may be executed despite these confirmations to improve the accuracy of the method 500.

In step 516, the method 500 retrieves past walk environment details.

In the illustrated embodiment, past walk environment details may include the same data as current environment details (e.g., time, location, movement, etc.) with respect to past walk events and/or may include details regarding future (i.e., scheduled events). For example, past walk environment details may additionally include a schedule of walks, a listing of responses to walk mode prompts (e.g., those collected in step 406 of FIG. 4), and other relevant details. In one embodiment, the method 500 may retrieve past walk environment details from local storage present on a tracking device. In alternative embodiments, the method 500 may retrieve past walk environment details from a server via a cellular or Wi-Fi connection.

In step 518, the method 500 determines if there is a match between the current environment detail and past walk environment details.

In the illustrated embodiment, the method 500 may compare the current details (e.g., time of day) to past, known walks to infer whether a walk mode should be enabled, and implicitly that a walk is taking place. For example, past walk environment details may include consistent data indicating that a walk often takes place on weekdays at noon. In one embodiment, the method 500 compares the current environment details (e.g., time of day, day of week) to the recorded past walk environment details and determines that since the current date and time corresponds to a known, historical walk schedule, a walk is occurring. In some embodiments, the method 500 may compute a binary answer to such comparisons. In alternative embodiments, the method 500 may calculate a probabilistic value indicating the likelihood of a walk occurring.

In alternative embodiments, the method 500 may employ machine-learning techniques to generate a predictive function to determine whether a walk is occurring based on current environment details. In one embodiment, the method 500 may generate such a function locally, while in alternative embodiments, the method 500 may retrieve the function (or the results thereof) from a remote data source (e.g., a server). In some embodiments, the method 500 may utilize a decision tree or similar mechanism to determine that a walk is occurring probabilistically. As discussed previously, these machine-learning techniques may be refined using manual prompts of the user. In alternative embodiments, the method 500 may additionally use inputs from other devices to refine the predictive function.

If the method 500 determines a match exists, step 518, the method 500 enables a walk mode (step 512), as discussed previously. If not, the method 500 optionally issues an alert that a tracking device exited a geo-fence zone.

As illustrated in FIG. 5, the method 500 may reach step 520 after exhausting all, or substantially all, means for determining whether a walk has begun. Nevertheless, the method 500 has previously detected that a tracking device has exited a geo-fence zone. In this embodiment, the method 500 may determine, for example, that an animal equipped with a tracking device, has strayed from a geo-fence zone on its volition. In this embodiment, the method 500 may alert a user (e.g., an owner) that the animal equipped with the tracking device may potentially be straying from a desired, geo-fenced zone. In some embodiments, the method 500 may additionally provide a prompt to the user allowing the user to confirm that a walk mode should not be occurring. As discussed previously, the method 500 may store this response and incorporate the response as part of the past walk environment details used in steps 516 and 518.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   detecting that a wearable device is in a walk mode in response to at least one of:
   determining that the wearable device has exited a geo-fence zone,
   determining that the wearable device is not connected to a wireless network, and determining that past walk environment details are similar to current environment details by comparing the current environment details associated with the wearable device to the past walk environment details associated with the wearable device to identify at least one similarity between the current environment details and the past walk environment details, and using a predictive function on the at least one similarity, the predictive function refined using one or more previous responses to a walk mode prompt; and transmitting a recorded GPS location of the wearable device while the wearable device is in the walk mode.

2. The method according to claim 1:

further comprising identifying a location of the wearable device; and wherein determining that the wearable device has exited the geo-fence zone comprises comparing the location to a plurality of latitude and longitude points defining a polygonal region representing the geo-fence zone.

3. The method according to claim 2 wherein identifying the location of the wearable device comprises:

identifying an active wireless network to which the wearable device is currently connected;

identifying a list of known wireless networks; and determining if the active wireless network is in the list of known wireless networks.

4. The method according to claim 3 wherein determining that the wearable device has exited the geo-fence zone comprises detecting that the wearable device has disconnected from the active wireless network.

5. The method according to claim 1 comprising prompting a user for confirmation that the wearable device is in the walk mode.

6. The method according to claim 1 wherein detecting that the wearable device is in the walk mode is further in response to detecting a presence of a known device within a predefined proximity to the wearable device and confirming an identity of the known device.

7. The method according to claim 1 wherein the environment details include at least one of a date, a time, a location of past walks, a list of scheduled walks, and the one or more previous responses to the walk mode prompt.

8. The method according to claim 1 wherein the current environment details include a date and a time it is determined that the wearable device has exited the geo-fence zone and a location of the wearable device.

9. The method according to claim 1 further comprising confirming that the wearable device is in the walk mode without confirmation of a user.

10. The method according to claim 1 further comprising alerting a user that the wearable device has exited the geo-fence zone if it is not confirmed that the wearable device is in the walk mode.

11. An apparatus comprising:

a processor; and a storage medium for tangibly storing thereon program logic for execution by the processor, the stored program logic comprising at least one of:

logic, executed by the processor, for detecting that a wearable device is in a walk mode in response to determining that the wearable device has exited a geo-fence zone, logic, executed by the processor, for detecting that the wearable device is in the walk mode in response to determining that the wearable device is not connected to a wireless network, or logic, executed by the processor, for detecting that the wearable device is in the walk mode in response to determining that past walk environment details are similar to current environment details by comparing the current environment details associated with the wearable device to the past walk environment details associated with the wearable device to identify at least one similarity between the current environment details and the past walk environment details, and using a predictive function on the at least one similarity, the predictive function refined using one or more previous responses to a walk mode prompt;

wherein the stored program logic further comprises logic, executed by the processor, for transmitting a recorded GPS location of the wearable device while the wearable device is in the walk mode.

12. The apparatus according to claim 11, the stored program logic further comprising:

logic, executed by the processor, for identifying a location of the wearable device; and logic, executed by the processor, for determining that the wearable device has exited the geo-fence zone by comparing the location to a plurality of latitude and longitude points defining a polygonal region representing the geo-fence zone.

13. The apparatus according to claim 12 wherein identifying the location of the wearable device comprises:

identifying an active wireless network to which the wearable device is currently connected;

identifying a list of known wireless networks; and determining if the active wireless network is in the list of known wireless networks.

14. The apparatus according to claim 13 wherein determining that the wearable device has exited the geo-fence zone comprises detecting that the wearable device has disconnected from the active wireless network.

15. The apparatus according to claim 11 wherein the stored program logic further comprises logic, executed by the processor, for prompting a user for confirmation that the wearable device is in the walk mode.

16. The apparatus according to claim 11 wherein the stored program logic further comprises logic, executed by the processor, for:

detecting a presence of a known device within a predefined proximity to the wearable device and confirming an identity of the known device; and detecting that the wearable device is in the walk mode is further in response to detecting the presence of the known device within the predefined proximity and confirming the identity of the known device.

17. The apparatus according to claim 11 wherein the environment details include at least one of a date, a time, a location of past walks, a list of scheduled walks, or the one or more previous responses to the walk mode prompt.

18. The apparatus according to claim 11 wherein the current environment details include a date and a time it is determined that the wearable device has exited the geo-fence zone and a location of the wearable device.

19. The apparatus according to claim 11 wherein the stored program logic further comprises logic, executed by the processor for confirming that the wearable device in the walk mode without confirmation of a user.

20. The apparatus according to claim 11 wherein the stored program logic further comprising logic, executed by the processor, for alerting a user that the wearable device has exited the geo-fence zone if it is not confirmed that the wearable device is in the-walk mode.

* * * * *